Jan. 1, 1924

W. G. MYLIUS

ELECTRICAL MEASURING INSTRUMENT

Filed Feb. 4, 1918

1,479,153

WITNESSES:
Ed. V Herron
J H Procter

INVENTOR
Walter G. Mylius
BY
Wesley G. Carr
ATTORNEY

Patented Jan. 1, 1924.

1,479,153

UNITED STATES PATENT OFFICE.

WALTER G. MYLIUS, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed February 4, 1918. Serial No. 215,389.

*To all whom it may concern:*

Be it known that I, WALTER G. MYLIUS, a citizen of the United States, and a resident of Wilkinsburg, in the county of Allegheny and State of Pennsylvania, have invented a new and useful Improvement in Electrical Measuring Instruments, of which the following is a specification.

My invention relates to electrical measuring instruments and particularly to transmission and adjusting devices for such instruments.

One object of my invention is to provide a single means for operatively connecting the pointer of a measuring instrument to the operating mechanism and for adjusting the initial position of the pointer.

Another object of my invention is to provide a frictionless transmission device that shall have means for adjusting the initial position of the pointer without lost motion.

A further object of my invention is to provide a device of the above-indicated character that shall be simple and inexpensive to construct and effective in its operation.

In carrying out my invention, I provide a pointer that is loosely mounted on the operating shaft of the instrument. A worm wheel is mounted on the operating shaft and is adapted to engage a worm screw that is mounted on the pointer. Means is provided for turning the worm screw to adjust the initial position of the pointer and means is also provided for holding the worm screw in the adjusted position in order that the pointer may be actuated, through the worm screw and worm wheel, from the operating shaft.

Figure 1:
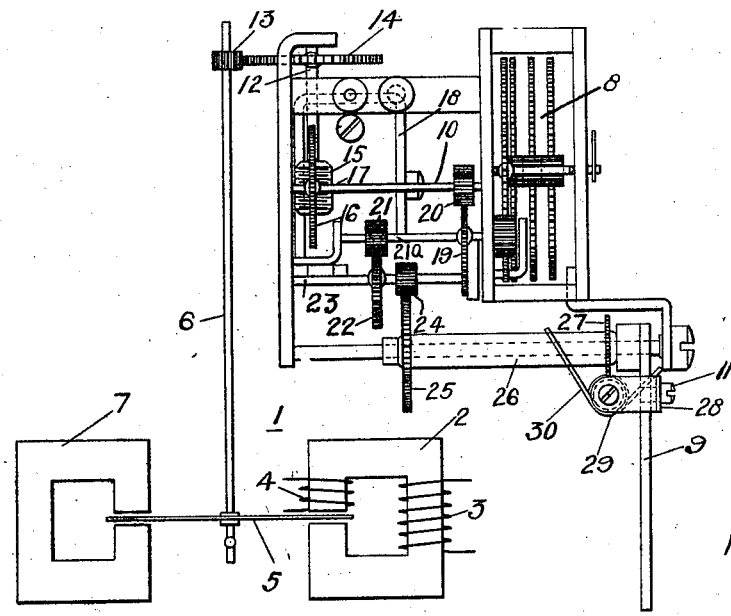
Figure 2:
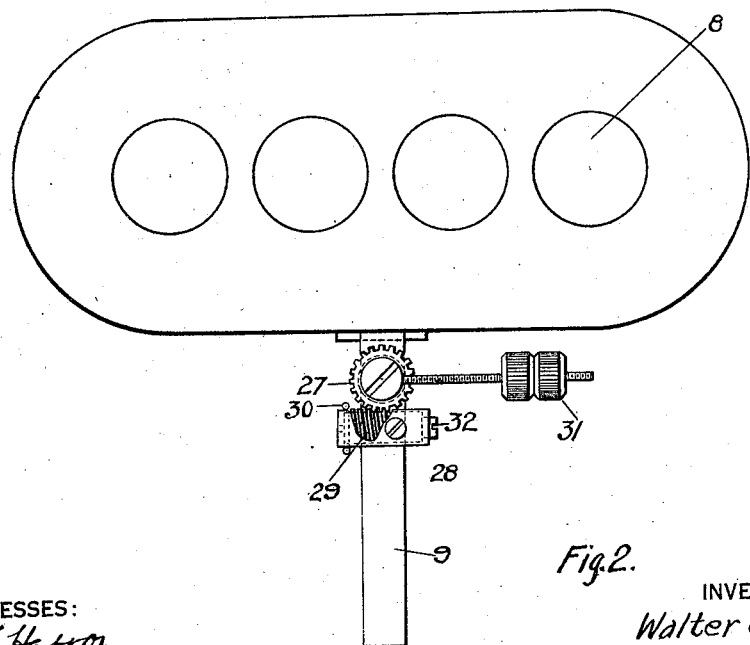

Figure 1 of the accompanying drawings is a side elevational view of a measuring instrument embodying my invention, and Fig. 2 is a front view, with portions broken away, of the measuring instrument shown in Fig. 1.

A maximum-demand meter 1, to which my invention is particularly adapted, comprises, in general, a magnetizable core member 2, current and voltage windings 3 and 4, an armature 5 that is mounted on a shaft 6, a damping magnet 7, an integrating device 8, a pointer 9, means 10 for disconnecting the pointer from the shaft 6, under predetermined conditions, and a transmission and adjusting device 11.

The shaft 6 is adapted to drive a shaft 12, through a pinion 13 and a gear wheel 14. A worm screw 15 is mounted on the shaft 12 and is adapted to engage a worm wheel 16 that is mounted on a shaft 17 which is carried by a cradle or rocking member 18. The integrating mechanism 8 is operatively connected to the shaft 17 through a gear wheel 19 and a pinion 20. A pinion 21, that is mounted on a shaft 21$^a$, upon which the gear wheel 19 is also mounted, is adapted to engage a gear wheel 22 that is mounted on a shaft 23. A pinion 24, that is mounted on the shaft 23, engages a gear wheel 25 that is mounted upon a shaft 26 upon which a worm wheel 27 is also mounted.

The pointer 9 is loosely mounted on the shaft 26, and a bracket 28 is mounted on the pointer 9 for supporting a relatively movable worm screw 29 that is adapted to engage the worm wheel 27. A spring 30 is secured to the worm screw 29 for the purpose of holding the same in any position to which it may be turned, relatively to the pointer 9.

When current traverses the windings 3 and 4 of the meter 1, the armature 5 will rotate to actuate the integrating mechanism 8, and the pointer 9 will be moved, through the wormwheel 27 and the worm screw 29, to a position that indicates the integrated maximum demand of the power traversing the windings 3 and 4. Means (not shown) is provided for so rocking the cradle 18 as to cause the worm wheel 16 to be disconnected from the worm screw 15, to thereby permit weight members 31 to return the pointer to its initial position periodically.

If it is desired to adjust the initial position of the pointer, it is only necessary to insert a screw driver, or other similar instrument, in the slotted end 32 of the worm screw 29 and turn the same to cause the worm screw 29 to co-operate with the worm wheel 27 to move the pointer 9 relatively to the shaft 26. The spring 30 will hold the worm screw 29 in this position to which it has been moved, and, when the cradle member 18 is again moved into its operative position, the turning of the shaft 26 will actuate the pointer 9 through the worm wheel 27 and the worm screw 29.

Since the worm wheel 27 and the worm screw 29 are in engagement, under all conditions, the device 11 constitutes a frictionless transmission mechanism and an adjusting mechanism having no lost motion.

While I have shown my invention as applied to a maximum-demand meter, it will be understood that it may be used in various other types of meters, and various modifications may be made therein without departing from the spirit and scope of the invention as set forth in the appended claims.

I claim as my invention:

1. The combination with a shaft and a pointer mounted on the shaft, of a worm wheel mounted on the shaft, and a worm screw mounted on the pointer and adapted to engage the worm wheel.

2. An adjusting device comprising a shaft, a worm wheel mounted thereon, a loosely mounted pointer on the shaft, a bracket mounted on the pointer, and a worm screw mounted on the bracket and adapted to engage the worm wheel.

3. An adjusting device comprising a shaft, a worm wheel mounted thereon, a loosely mounted pointer, a bracket mounted on the pointer, a worm screw mounted on the bracket and adapted to engage the worm wheel, and means for turning the worm screw to adjust the position of the pointer with respect to the shaft.

4. In a meter, the combination with an operating shaft, a worm wheel and a relatively movable pointer mounted thereon, of means mounted on the pointer for engaging the gear wheel to adjust the initial position of the pointer.

5. In a meter, the combination with a shaft and a radial indicating arm supported thereon and normally movable in concert therewith, of means for adjustably moving the arm and the shaft relatively.

6. The combination with an operating shaft and a pointer, of gear mechanism disposed between the pointer and the shaft for operatively connecting the pointer to the shaft and for adjusting the initial position of the pointer.

7. The combination with an operating shaft and a pointer loosely mounted thereon, of a worm screw mounted on the pointer and relatively movable therewith, a worm wheel mounted on the shaft and adapted to engage the worm screw, and means for preventing accidental relative movement of the worm screw with respect to the worm wheel and the pointer.

8. The combination with an operating shaft, a relatively movable pointer and a worm wheel mounted thereon, of a worm screw mounted on the pointer for engaging the worm wheel to operatively connect the pointer to the shaft, said worm screw being relatively movable with respect to the worm wheel to adjust the initial position of the pointer.

9. The combination with an operating shaft and a pointer loosely mounted thereon, of a gear mechanism for operatively connecting the pointer to the shaft and for moving the pointer relatively to the shaft, and a spring for preventing accidental relative movement of the pointer with respect to the shaft.

10. In a meter, the combination with an operating shaft, and a pointer loosely mounted thereon, of a worm-and-screw device disposed between the pointer and the shaft for operatively connecting the pointer to the shaft and for adjusting the relative position thereof.

11. In a meter, the combination with a shaft and a pointer loosely mounted thereon, of means for adjusting the pointer relatively to the shaft and for retaining the pointer in its adjusted position.

12. In a meter, the combination with a shaft and a pointer loosely mounted thereon, of mechanical means for adjusting the pointer relatively to the shaft and for retaining the pointer in its adjusted position.

13. In a meter, the combination with a shaft and a pointer loosely mounted thereon, of means for operatively connecting the shaft and the pointer and for effecting relative movement therebetween.

14. In a meter, the combination with a shaft and a pointer adapted to be actuated in accordance with movements of the shaft, of mechanism co-operating with the shaft and pointer and carried thereby for effecting adjusting movement of the pointer with respect to the shaft and for holding the pointer in adjusted position.

In testimony whereof, I have hereunto subscribed my name this 30th day of January, 1918.

WALTER G. MYLIUS.